J. A. GRACE.
COTTON CHOPPER.
APPLICATION FILED FEB. 8, 1910.
965,104.
Patented July 19, 1910.
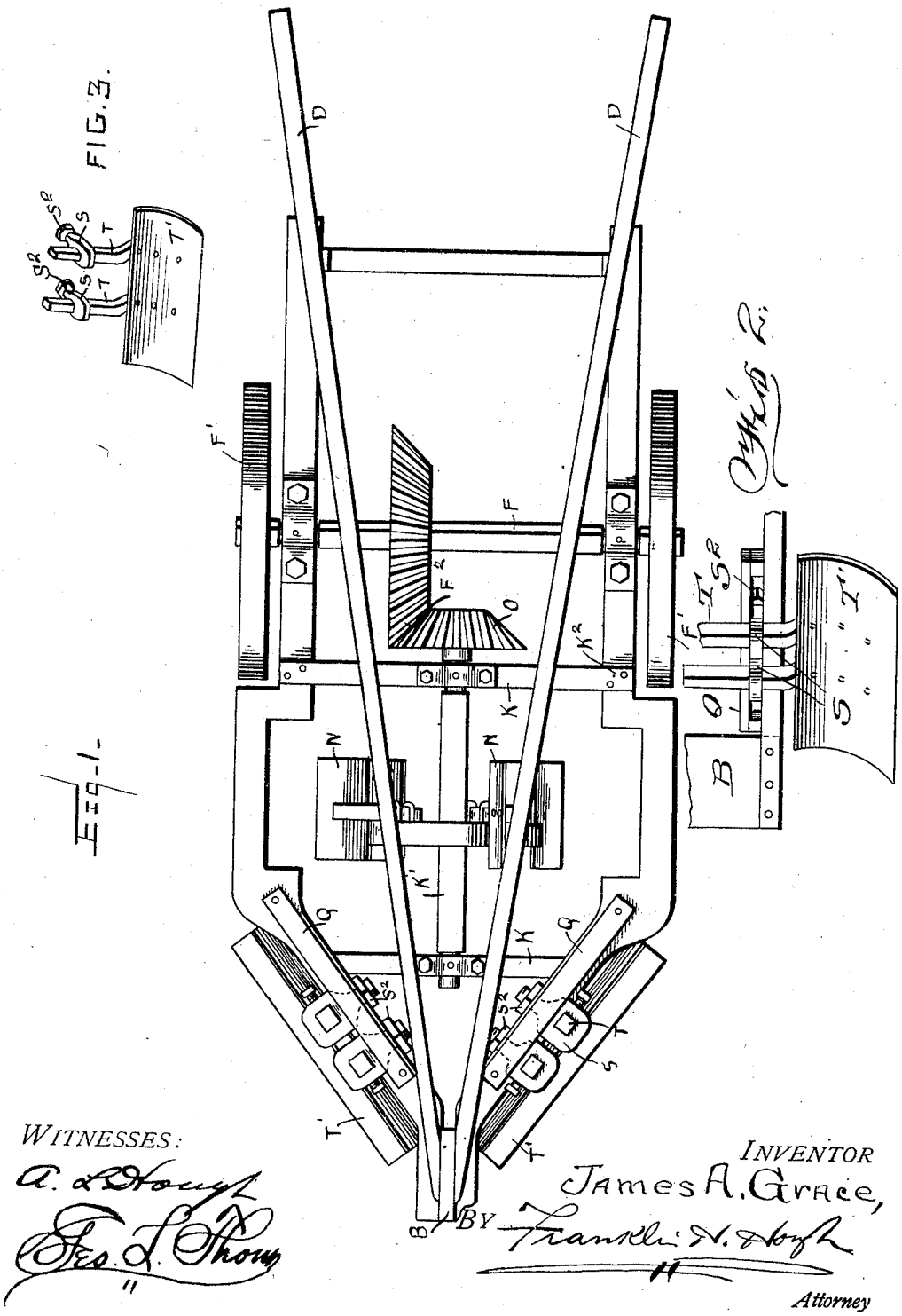
WITNESSES:
INVENTOR
James A. Grace,
BY
Attorney

UNITED STATES PATENT OFFICE.

JAMES ANDREW GRACE, OF DE KALB, MISSISSIPPI.

COTTON-CHOPPER.

965,104. Specification of Letters Patent. Patented July 19, 1910.

Application filed February 8, 1910. Serial No. 542,724.

*To all whom it may concern:*

Be it known that I, JAMES ANDREW GRACE, a citizen of the United States, residing at De Kalb, in the county of Kemper and State of Mississippi, have invented certain new and useful Improvements in Cotton-Choppers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in cotton scrapers and comprises various details of construction and combinations and arrangements of parts which will be hereinafter fully described and then specifically defined in the appended claim.

I illustrate my invention in the accompanying drawings, in which:—

Figure 1 is a top plan view of the apparatus. Fig. 2 is a sectional view, and Fig. 3 is a detail view.

Reference now being had to the details of the drawings by letter, A designates the frame of the apparatus having standards B and C to which the handles D are fastened. A shaft F is journaled in suitable bearings upon said frame and has wheels F' fixed thereto.

Mounted in suitable bearings in the cross-pieces K of the frame is a longitudinally disposed rotatable shaft K' having the chopper blades N fastened thereto in any suitable manner. The opposite ends of the cross-pieces K are recessed away as at $K^2$ for the reception of the side portions of the frame to which they are fastened. A pinion wheel O is fixed to the end of the shaft K' and meshes with a pinion wheel $F^2$ upon the shaft F and affords means whereby motion may be transmitted from the shaft F to the shaft carrying the chopper blades.

The forward portion of the frame of the apparatus is tapering and strips Q are held parallel to and spaced apart from each tapering portion of the frame, as shown clearly in the drawings, and between which strip and tapering portion of the frame are adjustably held the apertured plates S in which the knees T carrying the scrapers T' are adjustably held. Said plates S are of such a thickness as to fit snugly the space intermediate the strips Q and the upper face of the frame and upon the contracted threaded projections of each plate S a tightening nut $S^2$ is mounted and adapted, as they are turned against the inner edges of the strips Q and the inner marginal edges of the tapering portions at the forward end of the frame to clamp the inner edges of the knees against said strips and the outer inclined edges of the tapering portions of the frame, thereby securely holding the knees in adjusted positions.

By the provision of an apparatus as shown and described, it will be noted that the scrapers, each having a plurality of knees fastened thereto, may be rigidly held in various adjusted positions as may be desired to operate upon rows different distances apart and may be raised and lowered to hold the scraper in different positions, while the rotary chopper is adapted to cut the soil in the usual manner.

What I claim to be new is:—

In combination with the frame of a cotton scraper, the forward portion of which has inclined portions which are substantially at right angles to each other, strips fastened upon the upper faces of said inclined portions of the frame and spaced apart therefrom, scrapers, a plurality of knees fastened to each scraper, plates having apertures for the reception of said knees and adjustably mounted between said strips and the portions of the frame underneath the same, the shank portions of said plates being contracted and threaded, and nuts mounted upon the threaded portions and bearing against the inner marginal edges of the strips and the inner faces of the inclined portions of said frame.

In testimony whereof I hereunto affix my signature in the presence of two witnesses.

JAMES ANDREW GRACE.

Witnesses:
 E. W. ODEN,
 L. W. GRACE.